(12) United States Patent
Johnson et al.

(10) Patent No.: US 7,974,890 B2
(45) Date of Patent: Jul. 5, 2011

(54) INVENTORY SALES SYSTEM AND METHOD

(75) Inventors: Jerome Dale Johnson, North Mankato, MN (US); David Robert Lundberg, Mankato, MN (US); Dale Arthur Mehr, Mankato, MN (US)

(73) Assignee: Presentation Specialist Technologies, LLC, Indian Wells, CA (US)

( * ) Notice: Subject to any disclaimer, the term of this patent is extended or adjusted under 35 U.S.C. 154(b) by 286 days.

(21) Appl. No.: 12/418,080

(22) Filed: Apr. 3, 2009

(65) Prior Publication Data
US 2009/0192920 A1 Jul. 30, 2009

Related U.S. Application Data

(63) Continuation of application No. 08/879,070, filed on Jun. 19, 1997, now Pat. No. 7,519,549.

(51) Int. Cl.
*G06F 17/00* (2006.01)

(52) U.S. Cl. .......... 705/27; 705/28; 705/26; 705/22; 707/104.1; 709/206

(58) Field of Classification Search .......... 705/28, 705/27, 26, 22; 707/104.1
See application file for complete search history.

(56) References Cited

U.S. PATENT DOCUMENTS

| | | | |
|---|---|---|---|
| 4,591,983 A | 5/1986 | Bennett et al. | |
| 4,887,208 A | 12/1989 | Schneider et al. | |
| 4,972,318 A | 11/1990 | Brown et al. | |
| 4,992,940 A | 2/1991 | Dworkin | |
| 5,225,987 A | 7/1993 | Thompson | |
| 5,515,524 A | 5/1996 | Lynch et al. | |
| 5,526,257 A | 6/1996 | Lerner | |
| 5,708,798 A | 1/1998 | Lynch et al. | |
| 5,825,651 A | 10/1998 | Gupta et al. | |
| 5,844,554 A | 12/1998 | Geller et al. | |
| 5,878,401 A | 3/1999 | Joseph | |
| 6,055,516 A | 4/2000 | Johnson et al. | |
| 6,188,989 B1 | 2/2001 | Kennedy | |
| 6,453,302 B1 | 9/2002 | Johnson et al. | |

FOREIGN PATENT DOCUMENTS

WO WO 90/11572 10/1990

OTHER PUBLICATIONS (Sales-force automation comes of age. (including related articles on how Hewllet-Packard Co. Computer Systems Group implemented technology-enabled selling applications (hereinafter SFA) by Caudron, Shari; May 20, 1996; pp. 1-6.
Caudron, Shari, "Sales-force automation comes of age. (includes related articles on how Hewlett-Packard Co. Computer Systems Group implemented technology-enabled selling applications", Industry Week, vol. 245, No. 10, pp. 146-149, May 1996.

(Continued)

*Primary Examiner* — Vanel Frenel
(74) *Attorney, Agent, or Firm* — Hershkovitz & Associates, LLC; Abraham Hershkovitz

(57) ABSTRACT

A computer system and method of facilitating a sale which permits inventory information to be used in connection with a technology enabled selling (TES) system to facilitate a sale. The inventory information may be used during configuration of an item to be sold to a customer in a manner which allows the sales representative to more easily sell items from inventory if desired.

77 Claims, 9 Drawing Sheets

OTHER PUBLICATIONS

Dialog File 16 (Database PROMT(R)), No. 6170712, "IBM's AS/400 dicision and CWC release new, interactive sales system; New version of 'PSAS' distributed to 2,000 salespeople and business partners", Business Wire, 2 pages, May 6, 1996.

Dietz, Dan, "Customer-driven engineering", Mechanical Engineering, May 1996, vol. 118, No. 5, pp. 68.

W. Close, Gartner Group, Inc. Conference Presentation, Florida Symposium, pp. 1-18 (1997).

Weidner, Davis, "Hvac manufacturers see the need for sales automation software. (heating, ventilation, air conditioning, equipment makers, other companies improve customized selling)", Air Conditioning, Heating & Refrigeration News, vol. 199, No. 8, p. 10, Oct. 1996.

INVENTORY SALES SYSTEM AND METHOD

RELATED APPLICATIONS

This is a Continuation Application of U.S. application Ser. No. 08/879,070, filed Jun. 19, 1997, entitled "Inventory Sales System and Method," which is expressly incorporated herein in its entirety by reference thereto.

FIELD OF THE INVENTION

The present application is directed generally to a technology enabled sales (TES) system and, more particularly, to such a system which facilitates sales from an inventory of the selling entity.

BACKGROUND OF THE INVENTION

Over the past several years computers have been increasingly used in the sales industry. Computers have been typically used to accomplish discrete tasks such as contact management, cost and amortization spreadsheets, and the like. The speed and processing power of computers allow tasks which were previously quite time consuming to be accomplished almost instantaneously. Computers have also been used to store and handle large amounts of information about the products. Product information may be stored in a computer readable database, for example, and may be retrieved using a search engine. In certain industries, the computerized information and related technology is often used by a sales representative to facilitate a sales transaction. To this end, a number of sales-specific tools have been developed and used by sales representatives and organizations. The use of such tools in the sales process is known in the industry as technology enabling selling (TES).

In many instances, a sales representative will have the option of selling a product either from an existing inventory or by ordering the product customized to the particular needs and desires of the customer. A computer system may be used by the sales person to facilitate this process. For example, the sales representative, using a basic inventory database and search engine, may search the database for products in the inventory which have a desired component, characteristic, or product number. Such a system will typically generate a list of products available in the inventory which satisfy the search criteria.

As the number of options, features and permutations available for a given product increases, it becomes more difficult to find a product in current inventory which satisfies all or even most of the customer's desires. In response, sales representatives are inclined to custom order the desired product for the customer. When ordering a custom product, the sales representative may have a TES system available which helps the sales representative determine if a desired product can be built, making it easier for the sales representative to close the sale. Selling from inventory, however, is often the preferred choice of the selling entity since it is typically associated with faster delivery and reduces inventory costs. Often, the reduced costs can be passed along as a lower price to the customer increasing the likelihood of making the sale. It will be appreciated that there is a general tension between selling products from inventory and ordering a custom product.

SUMMARY OF THE INVENTION

Generally, the present application relates to TES systems and methods which facilitate the sale of items from an inventory of the selling entity. In one embodiment, a computer system implemented method is used to facilitate a sale of a product from an inventory of a selling entity. The computer system includes a memory arrangement and at least one processing unit coupled to the memory arrangement. In the method, product inventory information related to the inventory of the selling entity is stored in the memory arrangement. Configuration information related to selling entity products offered for sale by the selling entity is also stored in the memory arrangement. Information regarding a customer's needs related to the selling entity products is obtained. Product options are interactively selected to define a configured product which satisfies the customer's needs using the stored configuration information to constrain selection of the product options. Using the stored inventory information, one or more products which most closely correspond to the configured product are identified from the inventory of the selling entity.

In another embodiment, a computer system having a memory arrangement and at least one processing unit coupled to the memory arrangement is used to facilitate sales from inventory. Product inventory information related to the inventory of the selling entity and configuration information related to selling entity products offered for sale by the selling entity are stored in the memory arrangement. Information regarding a customer's needs related to the selling entity products are obtained and product options are interactively selected to define a sellable product which satisfies the customer's needs using the stored configuration rules and the stored product inventory information to constrain selection of the product options to product options available in the inventory of the selling entity.

In still another embodiment, in a memory arrangement of a computer system product inventory information related to the inventory of the selling entity and configuration information related to selling entity products offered for sale by the selling entity are stored. Information regarding a customer's needs related to the selling entity products is obtained. Product options are presented to a user of the computer system for selection by the user to define a configured product which satisfies the customer's needs using the stored configuration information to constrain selection of the product options. An indication of whether selection of a particular presented product option, if incorporated into the configured product, would preclude obtaining the product from the inventory of the selling entity is presented to the user based on the stored inventory information.

In another embodiment, a computer system is used to facilitate a sale of a product from an inventory of a selling entity. Product inventory information related to the inventory of the selling entity and configuration information related to selling entity products offered for sale by the selling entity are stored in a memory arrangement of the computer system. Information regarding a customer's intended uses of a product to be purchased is obtained and a corresponding value to each of the customer's uses depending on an importance of the use to the customer's uses depending on an importance of the use to the customer is assigned. Using the stored inventory information and the obtained information regarding the customer's intended uses and corresponding value, one or more products which are in the inventory of the selling entity and which most closely satisfy the customer's intended use of the product are identified.

The above summary is not intended to describe each illustrated embodiment or every implementation of the present invention. The figures and the detailed description which follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
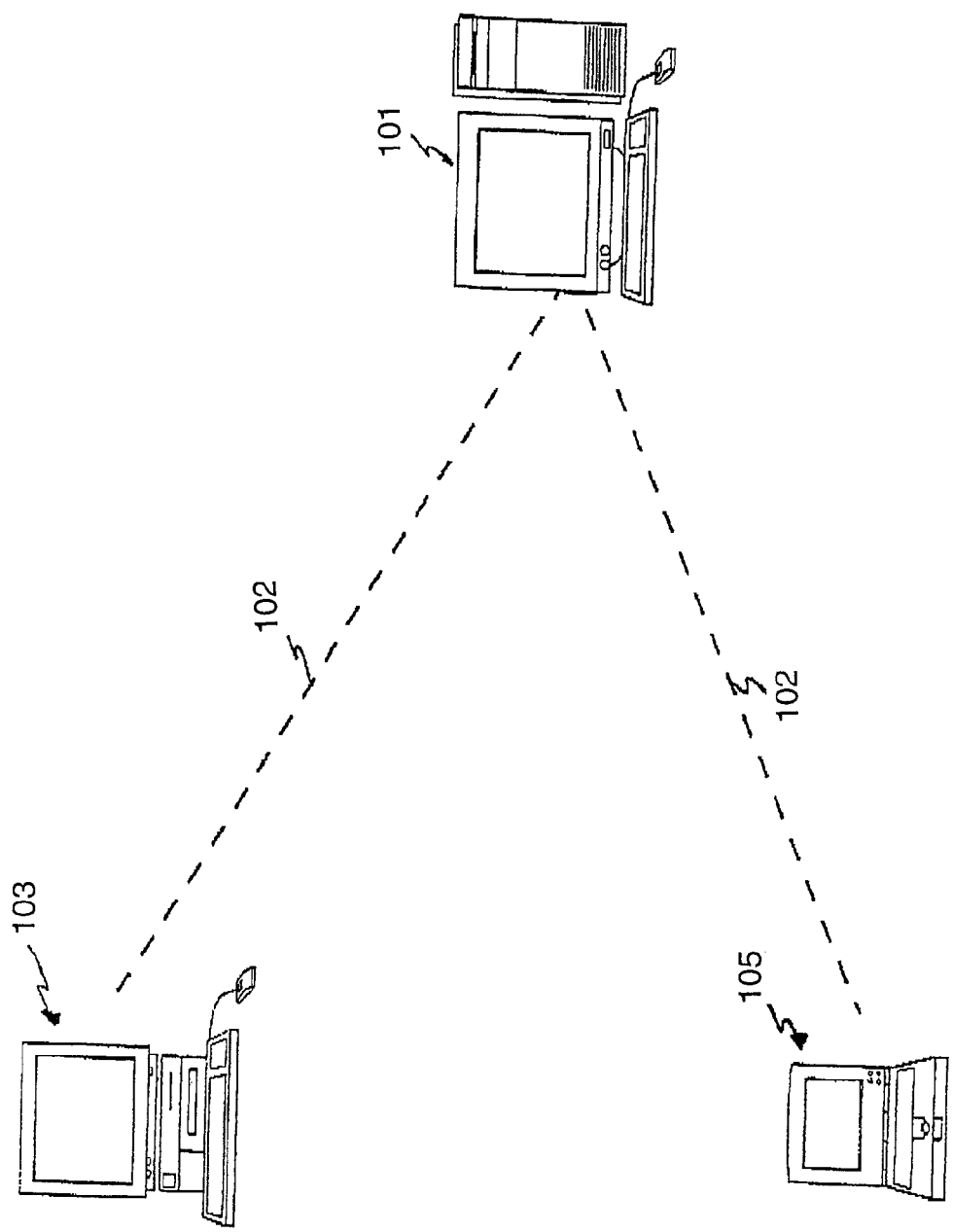
FIG. 1 depicts a computer system in accordance with one embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE VARIOUS EMBODIMENTS

The present application is applicable to a number of technology enabled selling (TES) systems used in an environment where selling products from an existing inventory may be desired. The present application is believed to be particularly advantageous for use in such TES systems in which a sales representative configures a product or service for sale by selecting a number of available features or options to generate a solution for the customer consistent with the customer's interest in the product. While the present invention is not so limited, an appreciation of various aspects of the invention will be gained through a discussion of such systems in connection with the examples provided below.

In the description of various embodiments of the present invention provided below, a TES system which facilitates the sale of products from inventory is described. The term product generally refers to anything which may be sold in the context of the invention is not limited any particular example. The term inventory is generally used to identify products which exist at the time of sale and may be sold by the selling entity. In this context, the term would include, for example, multiple inventories of different selling entities at diverse geographic locations.

Referring to FIG. 1, the general operation of one particular embodiment of the invention will be described. In FIG. 1, a back office computer 101 is provided at the home or back office of the selling entity. One or more remote computers are communicatively coupled to the back office computer 101 via a communication network 102 to exchange data. The remote computers may include for example, a desktop personal computer (PC) 103 and a laptop computer 105. It will be appreciated that the number and type of computers used as well as the physical location thereof may change depending on the environment in which the system is being used.

The various computers illustrated in FIG. 1 may be configured to interact in a number of different ways depending on the type of computer network used. For example, the computers may be configured in a client-server relationship, where the bulk of the operation and data is performed and stored at the back office computer 101 (server). Alternatively, each remote computer may store locally a run time database for operation in a distributed environment. The communication network 102, for example, may be a local area network (LAN), a wide area network (WAN), a wireless network or any other suitable network. The Internet may be used, for example, to connect the remote computers 103 and 105 to the back office computer 101. In general, any type of computer system may be used as long as it adequately supports the desired functionality described more fully below.

The remote computers 103 and 105 are typically used by a sales representative to facilitate the sale of a product to a customer. The laptop computer 105, for example, may be used by the sales representative at the customer's place of business. The desktop computer 103 may be used, for example, where the sales representative generally operates at a relatively fixed location. It will be appreciated that in certain instances the functions typically performed by the sales representative may be built into the user interface and software running on the remote computers 103 and 105 to permit the customer to interact directly with the system. Such a system would be particularly suited to facilitate sales directly to customers over the Internet, for example. In this example, the remote computers may be the customer's own computer, connected to the back office computer 101 via the Internet, a modem connection, or otherwise. In this context, the selling entity, for example, may be the entity which makes the items available for purchase over the Internet.

In the system depicted in FIG. 1, the computers 101, 103, and 105 are provided with various sales tools which are used by a user to facilitate the sales process. The back office computer 101 may be used, for example, to perform data management functions. The data managed at the back office computer 101 may include inventory data (representative of what particular products are available in inventory), product information, configuration rules, etc. As will be appreciated, the back office system computer 101 may be linked to the corporate enterprise system to perform a number of different functions.

The back office computer 101 is connected to the remote computers to share information to permit common usage of data input into any of the computers. In the remote computers, in accordance with one embodiment of the invention, a number of sales tools used by the sales representative are provided. The sales tool may include, for example, customer/account management tools, product information tools, financing tools, service tools, life cycle tools, proposal tools, presentation tools, and the like. These various tools, among other tasks, are used to assist the sales representative in retrieving and presenting information to a customer. The remote computers also include configuration capabilities which allow the sales representative to interactively configure a particular product which satisfies the customer's needs. For example, if the sales representative were selling an automobile, the sales representative would be able to select a model, engine, transmission, stereo, interior, paint, etc., from a list of options. A configuration tool is provided with a number of different rules or configuration solvers which constrain the process to allow only those products which are buildable to be selected.

In accordance with one particular embodiment of the invention, the configuration tool is tied to an inventory management tool which allows the sales person to configure products for sale from the inventory of the selling entity. In accordance with another embodiment of the invention, the configuration and inventory tools allow the sales representative to examine the impact a particular selection may have with respect to whether the product can be purchased from inventory. It will be appreciated that the inventory, as used herein, may include both new and/or used inventory. Thus, as a particular solution is being configured using a configuration tool, in accordance with an embodiment of the invention, inventory information may be examined and used through the configuration process in order to obtain the desired solution which most closely matches the customer's needs. Moreover, in accordance with one embodiment, the system immediately informs the sales representative when a configured solution is present in the inventory of the selling entity.

As will be appreciated, communication between the remote computers and the back office computer is necessary in order for the inventory information to be accurate and up-to-date. In accordance with one aspect of the invention, a small, run time database is provided to the remote computers. Each time the remote computer connects to the back office computer, the database is updated with new information. The current information, including information about which products are currently available in inventory, is automatically integrated into the database for use by the various tools. Accordingly, as a final step prior to completing a sale, the sales representative may connect up to the back office system and ensure that the item is available in inventory.

In accordance with one embodiment of the invention, the tools provided at the remote location may include an order management tool which will allow the sales representative to submit an order at that time and remove the availability of the particular item from the inventory. The system may also watch for sales which have been ordered, but not yet delivered, and alert the sales representative when a particular product ordered to be built becomes available in inventory. For example, a particular customer may be interested in a particular product whether the product is new or used. At the time the sales representative meets with the customer, no used articles are available meeting the customer's desired specification. The sales representative, using the configuration tool, may then configure a product to be ordered which satisfies the customer's needs. If, at a later time, a used article product is returned or traded in, which satisfies the customer's interests, the system may be provided with a prompting feature which prompts the sales representative of this event. In certain instances, it may be advantageous to halt the order of the new product and offer the used product from the inventory to the customer.

Figure 2:
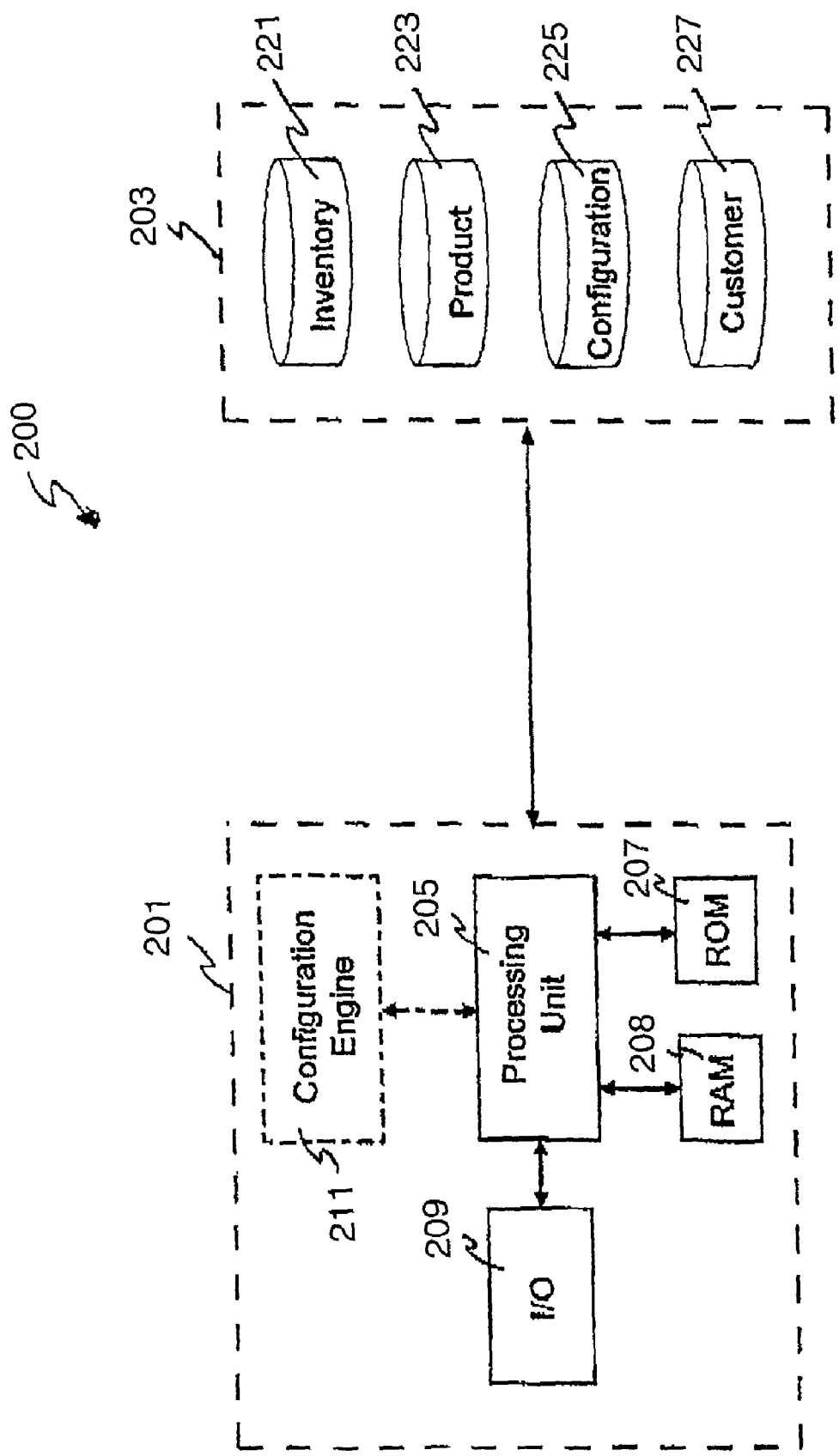
FIG. 2 depicts a particular embodiment of a computer system in accordance with another embodiment of the invention.

FIG. 2 represents generally in block diagram form an arrangement 200 provided as a tool for the sales representative to identify a product which satisfies the customer's needs, taking into account the inventory of the selling entity. The system 200 is conceptually divided into a processing arrangement 201 and a memory arrangement 203. The processing arrangement 201 includes at least one processing unit 205, read-only and random access memories 207 and 208 and input/output components 209. In FIG. 2, only a single processing unit is illustrated which could reside, for example, in one of the remote computers. It should be understood, however, that the functionality described herein could generally be implemented using more than one processing unit. Moreover, the various processing units could be located in a single location or distributed across different computers and at different locations.

The processing arrangement 201 also includes a configuration engine 211. It should be understand that the configuration engine 211 may represent a process implemented on the processing unit or may further include specific additional processing hardware.

The memory arrangement 203 includes a number of different data storage elements. The data storage elements include an inventory data storage element 221, a product data storage element 223, a configuration data storage element 225, and a customer data storage element 227. It will be appreciated that the memory arrangement illustrated in FIG. 2 may be implemented with one or more memories. The various data storage elements may comprise a number of different memory arrangements including, for example, different memories separated and operating on different computers, multiple memories within a single computer, or other memory configurations. In general, any memory arrangement capable of timely providing the data necessary for operation to the processing arrangement 201 may be used.

In operation, the system 200 depicted in FIG. 2 allows a sales representative to review, select, and prepare a solution for the customer, which includes a particular product offered for sale by the sales representative, based on the needs and desires of the customer. The configuration engine 211 controls the overall operation of the system. The configuration engine 211 presents product information to the user as well as product options to be selected by the user based on the product data in the product data storage element 223. The product options may represent, for example, different product categories or options available on a particular product. The configuration engine 211 further receives inventory information from the inventory data storage element 221 for presentation to the user. Information about the customer's interests in the product and specific selections of the customer are stored in the customer information storage data element 227. The configuration storage element 225 stores configuration rules, logic, relationships and the like, which are used by solvers in the configuration engine to ensure that selections by the user will result in a buildable, orderable, and/or available product. The inventory data storage element 221 is used by the configuration engine 211 to determine whether a particular selection or set of selections are currently available on one or more products in the inventory of the selling entity.

In operation, as described more fully below, the sales representative may be provided with a number of different product options for configuring a solution to a customer's needs or desires for a particular product. The system may present, for example, a list of groups into which products of the selling entity may be classified. Then, a list of product options may be presented to the user which represent various options which are available on various products of the selling entity. As the sales representative selects a particular product option which is desired by the customer, specific products, or other product options which are incompatible with the selected product option may be highlighted or deactivated to prevent subsequent selection of the incompatible product option or product. In this manner, the system 200 does not allow an incompatible selection by the sales representative. It is noted that incompatibility may result from engineering requirements as well as from other criteria such as user defined preferences.

The configuration engine 211 may use a number of different techniques to ensure that solutions are compatible and/or to find an optimal solution which satisfies the customer's needs. During this process, in accordance with various embodiments of the invention, information regarding the inventory of the selling entity may be integrated with the configuration process. For example, the inventory information may be used to alert the sales representative as to whether or not a particular option is available in inventory. In another embodiment, the system may be constrained to present only these products which are available in inventory. In still another alternative, the configuration engine may be used to first configure a buildable product which satisfies the customer's needs and to then search the inventory to locate the nearest match to the configured product.

Figure 3:
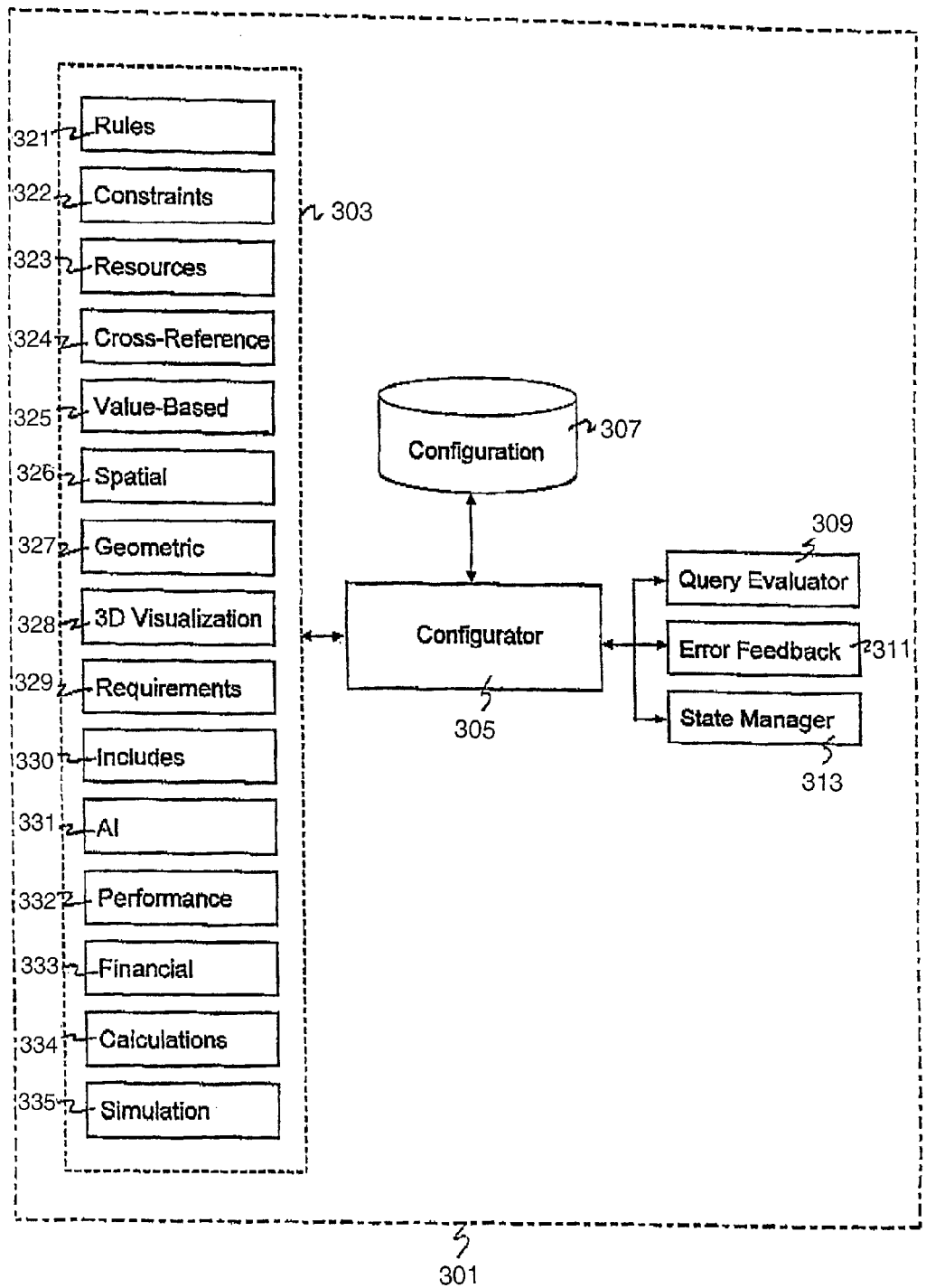
FIG. 3 depicts a configuration unit in accordance with one embodiment of the invention.

FIG. 3 illustrates in conceptual form a block diagram of various configuration components, one or more of which may be incorporated into a configuration engine. In FIG. 3, a configuration engine 301 includes a number of solvers 303. The various solvers in the solver group 303 represent different types of approaches which may be used to accomplish configuration of a desired product. It should be appreciated that any number of or combination of the solvers could be used depending upon the type of product being configured. The solver group 303 is coupled to a configurator 305 which interacts with the system in order to configure a product. A configurator 305, for example, interacts with the I/O portion of the system and controls the user interface. The configurator 305 also provides logical coupling to other elements of the system. The configuration engine 301 is further coupled to exchange information with a configuration database 307. The configuration database 307 may be physically located with or separate from the configurator 305. In general, the configuration database 307 holds information used by the configurator 305 as it performs the various functions of the respective solvers in the solver group 303. A query evaluator 309 is coupled to the configurator 305 and is used for the evaluation of free form queries on data within the system. The error feedback component 311 provides a mechanism to pass error conditions to the user interface related to the operation of the configurator 305. A state manager 313 provides the ability to track within the system the status of components (of the product being sold), history management, and component/subcomponent (of the product) relationships.

As noted above, the solver group 303 includes a number of different solvers which are used to perform various configuration functions. One or more of such solvers would be implemented in a given configuration engine 301. The number and type of solvers used depends on the type of product being sold. As will be appreciated, the solvers may be used both to configure a buildable product which can be ordered from the manufacturer, as well as products within inventory which satisfy a given criteria. The respective function and use of the various solvers is set out briefly below.

A logic rules solver 321 typically limits the number of units or options available using Boolean logic. Logic rules are typically established based on the attributes of the units and/or relationships between the units. Logic rules are generally developed to govern many different items, rather than providing one logic rule for each item. For example, a logic rule may specify that a particular automobile engine selection when configuring an automobile dictates that a particular automobile transmission must be used. As another example, a logic rule may specify that a particular bus card selection for a personal computer requires a particular processing family to be selected. The logic rules solver 321 may also include rules which restrict the availability of unit combinations that will technically work, but, for marketing reasons, are undesirable.

The constraint solver 322 limits the number of units or options available to select from by using engineering relationships. This type of solver is typically used when it is easier to express a problem by constraints which must be satisfied. This solver may specify, for example, that the torque capacity of a transmission must be greater than or equal to the torque produced by an engine coupled to the transmission. In this manner, general specifications of the particular components need only be entered and maintained and the system can use the constraint to prevent selection of incompatibly options.

The resources solver 323 limits the number of units or options available for selection based on defined relationships of the objects or options and resources used or required. For example, when configuring a personal computer, the PC slot availability is related to the card slot requirement. In this manner, the resources provided must match the resources consumed.

The cross-reference solver 324 limits the number of units or options available to select from using a competitive model. This solver is typically used where a customer knows the competitive model or part of interest but not the product of the selling entity. For example, a customer may say, "have product X, what do you have that compares?" Thus, the system facilitates configuration of a closest match to a competitive product or a closest match in inventory to a configured solution.

The value-based solver 325 limits or controls the units and/or options that are pre-selected or selectable based on scoring of features important to the user. This type of solver provides the ability to optimize an existing solution based on the value-based scoring. For example, attributes such as weight, comfort, speed, etc., may be taken into consideration in the configuration process.

The spatial solver 326 controls the options presented to the user based on how the options are positioned using spatial logic. Spatial logic can also be used to control the positioning or availability of components or other units that comprise a total solution. This type of solver may be used where semi-engineered solutions must be provided at a point of sale, or configured solutions must be placed in preexisting environments.

The geometric solver 327 is used to custom engineer components or options based on other components in the existing configuration. This type of solver is especially adapted for use where engineering at the point of sale is required.

The 3-D visualization solver 328 supports the generation of realistic 3-D views of a built configuration or group of options. The requirement solver 329 may be used to provide support for grouping options and controlling quantities within that group. The includes solver 330 is used to support configuration in selling where certain components are to include other components. The artificial intelligence (AI) solver is used with other solvers to access AI algorithms, such as neural nets and fuzzy logic.

The performance solver 332 is used in the configuration process to provide support for calculating operating parameters of a unit. A financial solver 333 provides for the evaluation of finance plans, amortization schedules, etc. The calculation solver 334 limits the number of units or options available for selection using relationships represented by mathematical formula. For example, the requirement that a center of a bearing shaft is dependent upon the length of the shaft, the diameter, torque, and rpm may be taken into account using the calculation solver 334. The final solver in the solver group 303 is a simulation solver 335. The simulation solver 335 controls or limits the options that are available or pre-selected by using simulation conditions and results. For example, a route simulation may be used for the configuration of a heavy truck. Upon simulation of highway results, the simulation solver may automatically add a jake brake to the truck configuration.

Figure 4A:
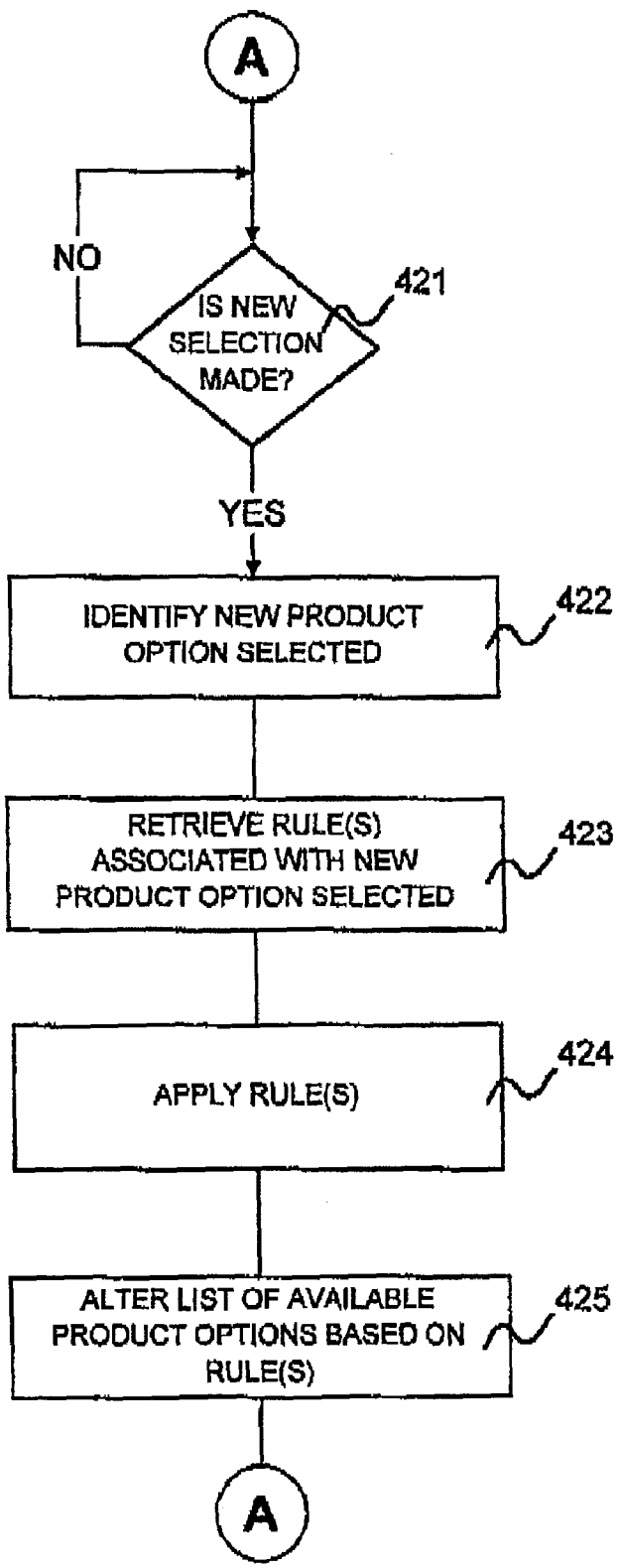
FIGS. 4A-4B are flow charts depicting an example operational flow of various embodiments of the invention.

FIG. 4A represents a flow chart depicting the operation of a configuration engine using the rules solver. When the rules solver is active, the system continually monitors to determine whether a new selection has been made from a list of product options as illustrated at step 421. If so, the system then identifies the new product options selected at step 422. The system retrieves from the configuration database rules which are associated with the new feature selected at step 423. The retrieved rules are applied at step 424, and the list of available features presented to the user for further selection are altered, at step 425 based on the rules. In this manner, at each selection, the rules are referenced and available product option selections presented to the user are modified so as to be consistent with the previous selection.

By way of example, in accordance with one embodiment of the invention a user may be operating the system in a manner which permits configuration of only those products which are available in an existing inventory. When the user selects a particular product option, which may be available on one product in inventory, a rule may be provided which identifies those products in inventory which do not have that product option. Once the products in inventory not containing the selected product option are identified, those product options or choices which are not available on the remaining inventory products are deactivated. In this manner, the user may select product options in an order which is most important to the customer, and then interactively configure a product which is available in inventory by narrowing the selections which can be made at each step of the process.

Figure 4B:
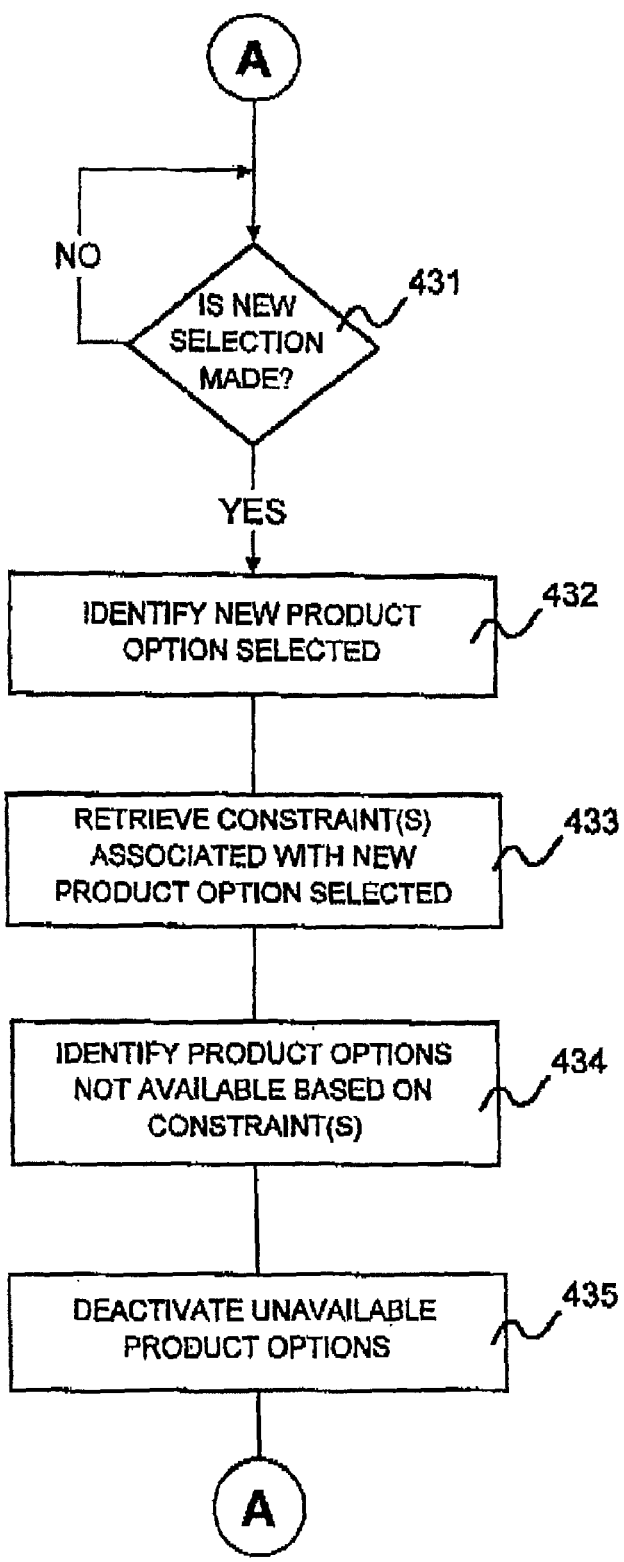

FIG. 4B illustrates a flow chart depicting the operation of constraint solver in accordance with one particular embodiment of the invention. The system continually monitors operation of the system to determine when a new selection is made at step 431. At the time a new product option is selected, the system identifies that product option at step 432. Constraint information associated with the new product option selected is retrieved at step 433 and those product options not available based on the constraints are identified at step 434. At step 435, the unavailable product options are deactivated. Thus, in a manner similar to that described above, when a particular product option is selected, the constraints may be applied to ensure that this product option is compatible with those available in inventory. In this manner, an interactive configuration of a product which is available in inventory can be accomplished.

Figure 5:
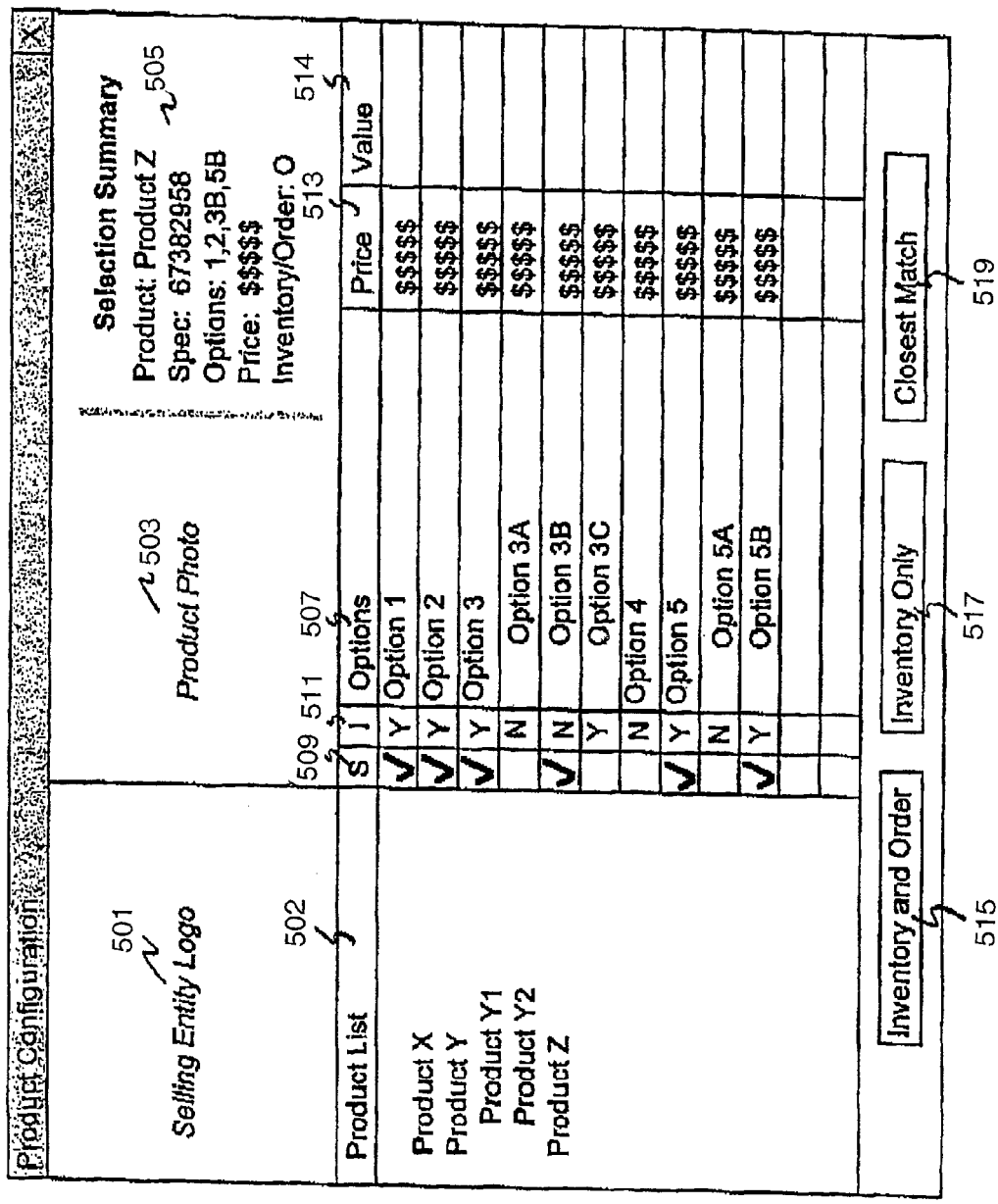
FIG. 5 depicts an example user interface in accordance with an embodiment of the invention.

An example of one particular user interface which could be used in connection with an embodiment of the present invention is depicted in FIG. 5. The user interface depicted in FIG. 5 illustrates an interface used which may be used for product configuration. It should be understood that product configuration could be implemented in a standalone system or could be a modular component of a larger TES system. The user interface of FIG. 5 includes a first portion of 505 depicting a logo of the selling entity. A product list 502 is presented to the user from which the user selects a particular product of interest. In a product photo section 503, a photo of the selected product may be displayed. Upon selection of a product, a set of product options 507 available for that product are presented to the user.

The user may select a product option by clicking in the first column 509 corresponding to the selected option(s). This could be done using a mouse, keypad, touch screen or other suitable user input device. The first column 509 also provides an indication (e.g., with a check mark) of whether or not the particular product option has been selected. A second column provides an indication (e.g., Y=Yes, N=No) of whether or not the particular product option is available in inventory. A third column 513 is provided which illustrates the price associated with the particular product option. As will be appreciated, the price of the product options may vary depending upon whether the product is coming from inventory or not. This may be reflected by illustrating the option as two separate product options or by providing inventory and non-inventory prices in the price column.

A selection summary portion 505 of the display, identifies the particular product selected, specifications for the product, product options selected, the pricing information, whether the product can be ordered from inventory (I=Inventory/O=Order), and the like. As will be appreciated in the illustrated example, the selection of product option 3B prevents the product Z from being ordered from inventory. If the configuration were to change to select sales product option 3C instead of product option 3B, the product would then be orderable from inventory. In this manner, while building the system, the sales representative is able to visually determine the availability of various product options and products which are available in inventory. This information may be used to influence the customer to purchase from inventory if desired. For example, it may be that a lower price could be obtained in inventory based on a price reduction implemented to move products out of inventory. In another situation, product option 3C may be a higher priced option, but since the product is available in inventory, the customer may be willing to pay for the price in order to receive the product in an expedited fashion.

The illustrated user interface also includes three buttons 515, 517 and 519. The buttons may be part of the user interface presented on the screen activated using standard input devices (e.g., keyboard, mouse, etc.). When the first, inventory and order button is selected, the product options presented to the user include both those product options available from inventory and those which are not available in inventory but which could be built or manufactured. The inventory only button 517 may be selected to constrain the available product options to those which are available in inventory. As will be appreciated from the above description, configuration logic is applied, using the various solvers, to constrain the product options made available to the user. The selection of one product option may deactivate or eliminate another. For example, if the selection of product option 2 precluded the selection of product option 4, product option 4 would be deactivated so that the option could not be selected. The deactivation may include, for example, illustrating the deactivated product option in a different manner or removing the deactivated product option from the product option selection portion 507 of the interface. In this manner, a sales process is facilitated in which the product may be sold from inventory where available and as desired.

The closest match button 519 may be used, for example, when the customer desires to purchase from inventory, but uncertain which product options are most important. When this button is selected, the user will receive all product options which can be built in a product ordered from the factory, whether the options are available in inventory or not. A desired product is configured by selecting from the available product options. After completion of the configuration process the closest match button may be selected and the system then produces a list of products in inventory which most closely match the product options selected during the configuration process. This allows the sales representative to use the configurator engine in order to select buildable products followed by a search and match routine which identifies product options in inventory which most closely match the buildable product.

A value column 514 is illustrated next to the price column 513 and is provided to input a value associated with the particular option selection. The value associated with the option selection can be used in connection with the value-based solver in order to locate a particular solution which most closely meets or satisfies the user's preferences. The value-based solver and the information inputted therein may be further used in connection with the closest match function in order to identify products in inventory which most closely match a configuration of the product for the customer based on the customer's preferences. It will be appreciated that the value can be affected in a number of different ways. For example, a scale of 1 to 10 may be used to rank the relative value of a particular option. Alternatively, a ranking relative to other options may be selected where the number of options is relatively low, for example.

It will be appreciated that the above-described user interface and functions thereof are provided by way of example only. The available functions may be modified to include only a subset of these functions or additional functions as desired for the type of product being sold. For example, a system may provide only the visual indication of whether a particular option is available in inventory during the configuration process without the closest match function to the value-based function. Moreover, other modifications and uses of an inventory configuration function will be apparent to those having skill in configurations and TES systems upon review of the present description.

It will be appreciated that the various configuration processes described can be used in may different ways. For example, an embodiment of the invention may use a configuration system to configure an overall product which needs to be built, but which also allows the user to determine whether particular components of the product can be obtained from inventory. For example, the system could be used to configure custom-ordered computer system. While the particular computer configured may not be available in inventory (e.g., may not yet be built), the system can be used to constrain the selection of components that will be put in the computer to those components which are available in inventory. In this manner, the custom computer may be delivered in a more timely fashion by eliminating the need to order components or parts.

Additional details of various aspects of the above-described functions will be further provided below in connection with FIGS. 6-9. It should be appreciated, however, that the descriptions provided are by way of illustration and not of limitation.

Figure 6:
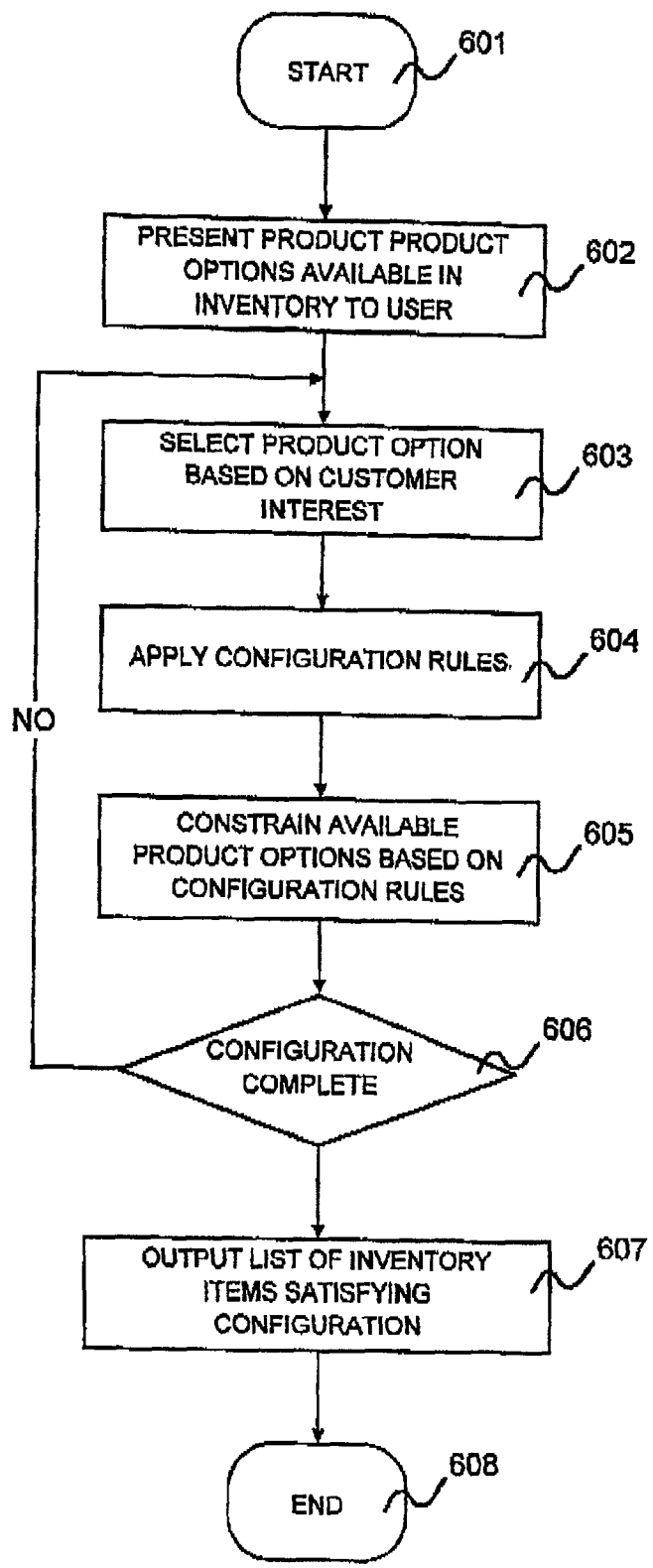
FIG. 6 is a flow chart depicting an operational flow chart of an embodiment of the invention.

FIG. 6 depicts an example operational flow of a system functioning to permit configuration of only those products available in inventory. At step 602, the system presents product options available in inventory to the user. In general, product options unavailable in inventory will be deactivated.

From the product options presented to the user, a selection is made based on the customer's interest in the various products and product options in step 603. After a selection is made, using one or more configuration solvers, configuration rules are applied to the selection at step 604. Based on the application of the configuration rules, at step 605, any product options which would no longer be available from inventory or which are incompatible with the selection (e.g., due to various configuration requirements) are identified and deactivated.

At step 606, a determination is made whether the configuration is complete. This determination may be automatic, for example, by determining whether a complete product is configured, or may be in response to manual input from the user. If the configuration is not complete, the system returns to step 603 where a selection may be made from the remaining available product options. It will be understood that the remaining product options are those which remain available after application of the configuration rules and constraints. Once the configuration is complete, at step 606, the system outputs a list of inventory items which satisfy the configuration at step 607. When configuring an orderable product, a single customer solution is generated. It will be appreciated that more than one inventory item may satisfy the selections of the user. Thus, a comprehensive list may be output and a user may select from a list a particular item to be purchased. At this point, the inventory only process is halted at step 608.

Figure 7:
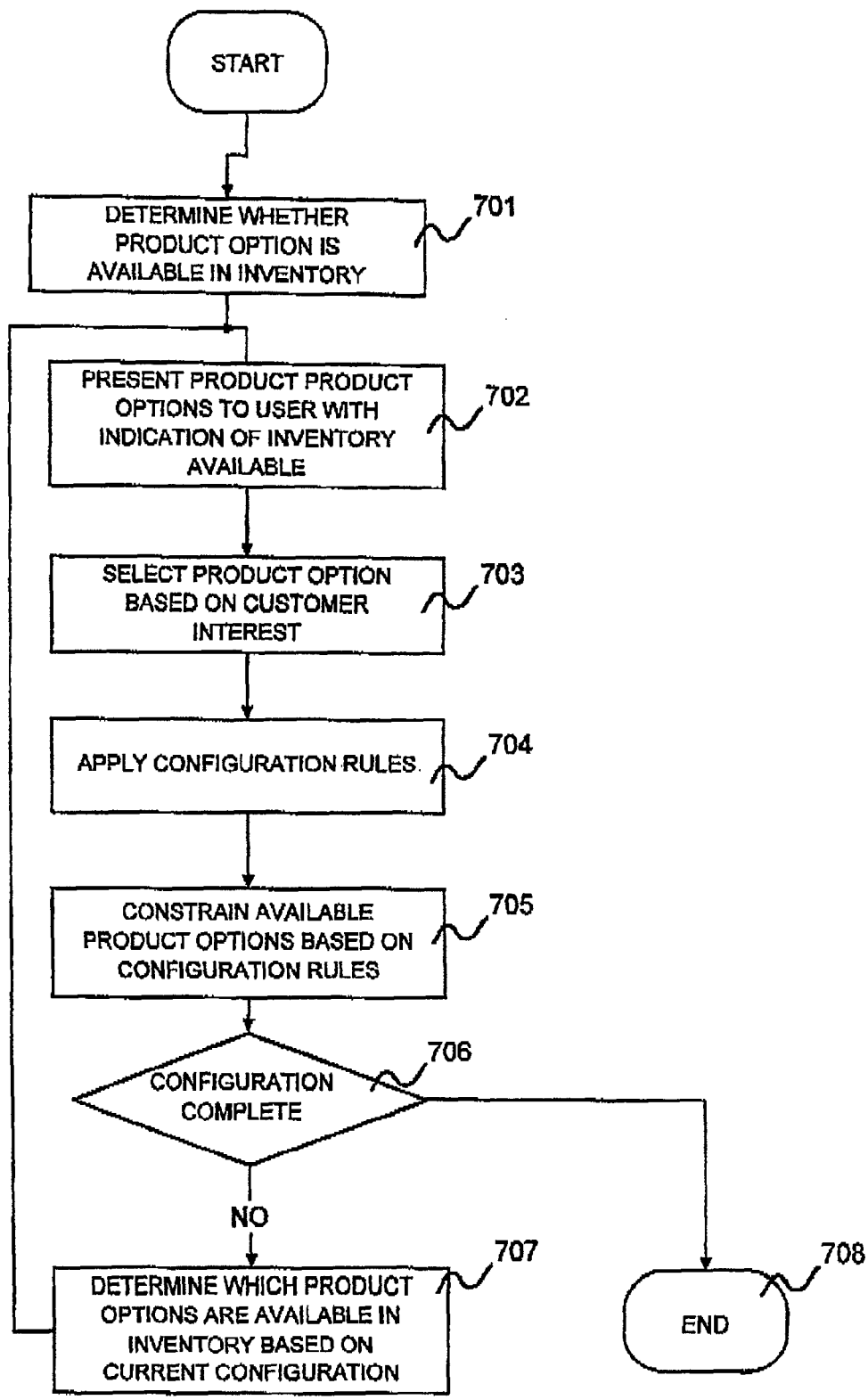
FIG. 7 is an operational flow chart of another embodiment of the invention.

An example operational flow of a configuration allows configuration of either an inventory item or a non-inventory item is depicted in FIG. 7. At the time the configuration is started, the system determines which product options are available in inventory at step 701. At step 702, the system presents to a user product options for all products regardless of whether the options are available in inventory. The system also provides an indication of whether a particular product options is available in inventory.

The system receives a selection of a particular product feature based on the customer's interest at step 703. At step 704, configuration rules are applied to the particular selection using one or more configuration solver. At step 705, the product options which are available for future selection are constrained to those now available based on the configuration process.

At step 706, it is determined whether the configuration process is complete. If the configuration process is not complete, the system proceeds to determine which of the remaining available product options are also available in inventory based on the current configuration. It will be appreciated, that initially a particular product may be available in inventory. The selection of a particular product option may render a number of other product options unavailable in inventory. For example, the particular product feature selected may be unavailable in inventory or available in inventory only with a small subset of other product options. Once the determination is made as to which of the remaining product options are also available in inventory, the system returns to step 702 and presents to the user those features which are now available with an indication as to whether they are available from the inventory from the selling entity. If at step 706, the configuration is complete, the process flow illustrated in FIG. 7 is ended at step 708.

Figure 8:
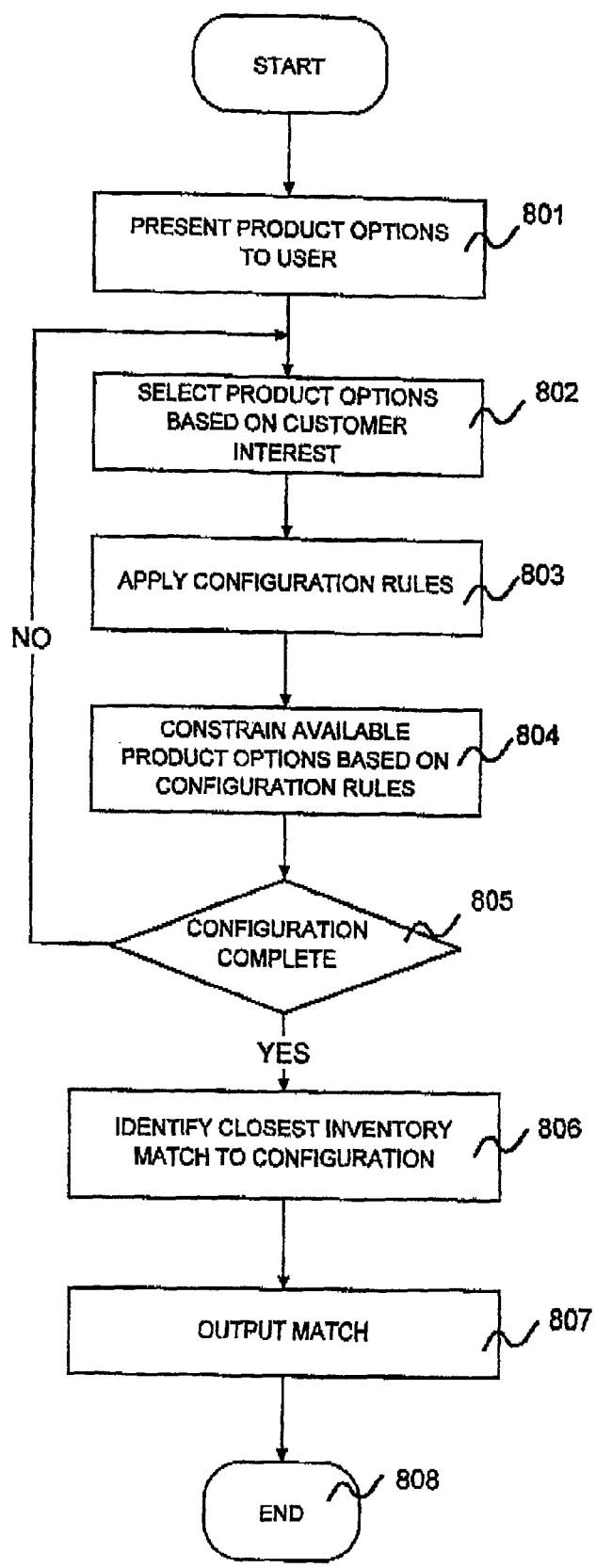
FIG. 8 is an operational flow chart of still another embodiment of the invention.

FIG. 8 illustrates an example operational flow where a configuration system is used to identify a closest inventory match to a particular configuration. At step 801, the system presents to a user a list of product options available. This list generally includes product options used in configuration of any orderable product. At step 802, a selection is made of a particular option based on the customer's interest. At steps 803 and 804, the system applies configuration rules using one or more of the above-described solvers, and constrains future available product options based on the application of the configuration rules. At step 805, it is determined whether the configuration of a product is complete. If not, the system proceeds to step 802 where another product option is selected from the remaining available product options.

If the configuration is complete at step 805, the system proceeds to step 806. At step 806, the system identifies the closest inventory match to the completed configuration. The inventory generally identifies products available in inventory by comparing product options selected during the configuration with products options available on products in inventory. It will be understood that the system may automatically assign values to particular product options or particular selections in order to identify the closest match. Alternatively, a value judgment may also be taken into account in order to identify the closest inventory match to the particular configuration. The value judgment may be based on value information obtained from the customer. Upon identifying one or more inventory items which match the configured solution, the system outputs the inventory list of matching items to the user at step 807. The output match may be used by the sales representative to facilitate a purchase of an inventory item. On completion of the output of the inventory match, the system halts the operation at step 808.

In the above examples, various configuration techniques have been described. The present invention is not limited to the specifics of the examples. For example, fuzzy logic may be used to facilitate configuration rather than a decision tree. Fuzzy logic is particularly suited for configuration where a single ultimate solution can not be defined based on the input such as value based configuration, for example.

As noted above, the present invention is applicable to a number of different sales system. Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

What is claimed is:

1. A method of facilitating a sale of a product to a customer using a computer system and an inventory of a selling entity, the method comprising:
    providing a computer system which includes at least one back office computer and at least one remote computer;
    receiving information into the computer system regarding a customer's needs and desired option selections related to one or more of products of the selling entity;
    receiving a value input associated with each desired option selection into the computer system ranking the importance of each of the desired option selections;
    defining a configured product satisfying the customer's needs and the desired option selections using one or more solvers containing logic rules constraining selection of available product options; and
    identifying from the inventory of the selling entity one or more available products that most closely match the configured product having the desired option selections of the customer based on the value input associated with the desired option selections,
    wherein the at least one remote computer is in communication with the at least one back office computer.

2. The method of claim 1, wherein the at least one remote computer comprises at least one run time database.

3. The method of claim 2, further comprising updating the run time database of the at least one remote computer with information from the at least one back office computer.

4. The method of claim 1, further comprising permitting common usage of data input into any of the at least one back office computer and the at least one remote computer by having the at least one back office computer and the at least one remote computer share information.

5. The method of claim 1, wherein the at least one remote computer comprises at least one sales tool.

6. The method of claim 5, wherein the at least one sales tool comprises at least one of, a customer or account management tool, a product information tool, a financing tool, a service tool, a life cycle tool, a proposal tool, a presentation tool or any combination of these tools.

7. The method of claim 5, further comprising assisting a user in retrieving and presenting information to the customer by using the at least one sales tool.

8. The method of claim 1, wherein the at least one remote computer has configuration capabilities which allows a user to interactively configure a particular product which satisfies the customer's needs.

9. The method of claim 1, wherein at least one configuration tool is in communication with at least one inventory management tool, and the at least one inventory management tool allows a user to configure a product for sale from the inventory of the selling entity.

10. The method of claim 9, wherein the at least one configuration tool and the at least one inventory management tool allow a user to examine an impact that a particular selection may have with respect to whether a product can be purchased from the inventory.

11. The method of claim 1, wherein the at least one back office computer manages data.

12. The method of claim 11, wherein the data that is managed by the at least one back office computer comprises at least one of, inventory data, product information, configuration rules, or any combination of these.

13. The method of claim 1, wherein the at least one remote computer comprises a user interface and software to permit customers to interact directly with the computer system.

14. The method of claim 1, wherein the at least one remote computer is in communication with the at least one back office computer by using at least one of, a local area network, a wide area network, a wireless network, or any combination of these networks.

15. The method of claim 1, wherein the at least one remote computer is in communication with the at least one back office computer by using the internet.

16. The method of claim 1, wherein the at least one remote computer comprises an order management tool that allows a user to submit an order and remove the availability of a particular item from the inventory.

17. The method of claim 1, wherein the computer system is configured to identify sales which have been ordered, but not yet delivered, and alert a user when a particular product ordered to be built becomes available in the inventory.

18. The method of claim 1, further comprising:
    selecting by a user a particular product option which is desired by the customer; and
    having a specific product or other product options which are incompatible with the selected product option highlighted or deactivated by the computer system to prevent subsequent selection of the incompatible option or product.

19. The method of claim 18, wherein the system prevents a user from selecting the compatible option or product.

20. The method of claim 1, wherein the computer system comprises a cross-reference solver that limits the number of units or options available to a user to select from a competitive model or product.

21. The method of claim 1, wherein the value input associated with the desired options corresponds to a numeric value indicating importance of the associated desired option selection.

22. The method of claim 21, wherein the numeric value used in the value input corresponds to a value between 0 and 10.

23. The method of claim 1, wherein the value input associated with the desired options corresponds to a relative value indicating importance of the associated desired option selection as compared to other desired option selections, and the identifying step comprises identifying from the inventory of the selling entity one or more available products that most closely matches the configured product based on using the relative values of the value input associated with the desired option selections.

24. The method of claim 1, wherein the logic rules comprise constraint rules which define engineering relationships between product options used to constrain use of combinations of options.

25. The method of claim 1, wherein the logic rules comprise resource rules which define relationships between product options in terms of resources used and resources required.

26. The method of claim 1, wherein the logic rules comprise cross-reference rules which define relationships between similar product options.

27. The method of claim 1, further comprising presenting to the customer by utilizing the computer system with the one or more identified available products found in the inventory of the selling entity, the closest matches of the configured product which have the desired option selections of the customer.

28. The method of claim 1, further comprising identifying from the inventory of the selling entity one or more available products that exactly correspond to the configured product.

29. The method of claim 1, further comprising storing in a memory arrangement of the computer system product inventory information related to the inventory of the selling entity, and wherein the identifying step comprises identifying from the inventory of the selling entity, as stored in the memory arrangement, one or more available products that most closely match the configured product.

30. The method of claim 1, further comprising storing in a memory arrangement of the computer system configuration information related to selling entity products offered for sale by the selling entity, and wherein the defining step comprises defining the configured product which satisfies the customer's needs by constraining the selection of available product options to those stored in the memory arrangement as configuration information.

31. A method of facilitating a sale of a configurable product using a computer system and an inventory of a selling entity, the method comprising:
providing a computer system comprising at least one back office computer and at least one remote computer;
presenting to a customer by use of the computer system, desired option selections available for inclusion within one or more of the selling entity configurable products;
receiving information into the computer system regarding needs of the customer and desired option selections related to one or more of the selling entity configurable products;
receiving a value input associated with each desired option selection into the computer system ranking importance of each of the desired option selections;
defining a configured product found within the inventory of the selling entity satisfying the needs of the customer and the desired option selections using one or more solvers containing logic rules constraining selection of available product options; and
presenting to the customer by utilizing the computer system, one or more configured products found in the inventory of the selling entity that most closely match the desired option selections specified by the customer based on the value input associated with the desired option selections,
wherein the at least one remote computer is in communication with the at least one back office computer.

32. The method of claim 31, wherein the at least one remote computer comprises at least one run time database.

33. The method of claim 32, further comprising updating the run time database of the at least one remote computer with information from the at least one back office computer.

34. The method of claim 31, further comprising having the at least one back office computer and the at least one remote computer share information to permit common usage of data input into any of the at least one back office computer and the at least one remote computer.

35. The method of claim 31, wherein the at least one remote computer comprises at least one sales tool.

36. The method of claim 35, wherein the at least one sales tool comprises at least one of, a customer or account management tool, a product information tool, a financing tool, a service tool, a life cycle tool, a proposal tool, a presentation tool, or any combination of these tools.

37. The method of claim 35, wherein the at least one sales tool is used to assist a user in retrieving and presenting information to the customer.

38. The method of claim 31, wherein the at least one remote computer has configuration capabilities which allow a user to interactively configure a particular product which satisfies the customer's needs.

39. The method of claim 31, wherein at least one configuration tool is in communication with at least one inventory management tool, and the at least one inventory management tool allows a user to configure a product for sale from the inventory of the selling entity.

40. The method of claim 39, wherein the at least one configuration tool and the at least one inventory management tool allow a user to examine an impact that a particular selection may have with respect to whether a product can be purchased from the inventory.

41. The method of claim 31, wherein the at least one back office computer manages data.

42. The method of claim 41, wherein the data that is managed by the at least one back office computer comprises at least one of, inventory data, product information, configuration rules, or any combination of these.

43. The method of claim 31, wherein the at least one remote computer comprises a user interface and software to permit customers to interact directly with the computer system.

44. The method of claim 31, wherein the at least one remote computer is in communication with the at least one back office computer by using at least one of, a local area network, a wide area network a wireless network, or any combination of these networks.

45. The method of claim 31, wherein the at least one remote computer is in communication with the at least one back office computer by using the internet.

46. The method of claim 31, wherein the at least one remote computer comprises an order management tool that allows a user to submit an order and remove the availability of a particular item from the inventory.

47. The method of claim 31, wherein the computer system is configured to identify sales which have been ordered, but not yet delivered, and alert a user when a particular product ordered to be built becomes available in the inventory.

48. The method of claim 31, further comprising
selecting by a user of a particular product option which is desired by the customer; and
having specific product or other product options which are incompatible with the selected product option highlighted or deactivated by the computer system to prevent subsequent selection of the incompatible option or product.

49. The method of claim 48, wherein the system prevents a user from selecting the compatible option or product.

50. The method of claim 31, wherein the computer system comprises a cross-reference solver that limits the number of units or options available to a user to select from a competitive model or product.

51. The method of claim 31, wherein the value input associated with the desired option selections corresponds to a numeric value indicating importance of the associated desired option selection.

52. The method of claim 31, wherein
the value input associated with the desired options corresponds to a relative value indicating importance of the associated desired option selection as compared to other desired option selections, and
presenting to the customer through the computer system with one or more configured products comprises presenting the one or more configured products found in the inventory of the selling entity that most closely matches the configured product based on using the relative values of the value input associated with the desired option selections.

53. A computer system facilitating a sale of a product from an inventory of a selling entity, the system comprising:
at least one back office computer and at least one remote computer;
a memory arrangement having stored therein product inventory information related to the inventory of the selling entity and configuration information related to selling entity products offered for sale by the selling entity;
a user interface configured to receive from a customer needs and desired option selections related to one or more of products of the selling entity; and
a configuration engine, operatively coupled to the memory arrangement and user interface, that (i) receives a value input associated with each desired option selection ranking the importance of each of the desired option selections, (ii) defines configured product satisfying the customer's needs and the desired option selections using one or more solvers containing logic rules constraining selection of available product options, and (iii) identifies from the stored product inventory information of the selling entity, one or more available products that most closely match the configured product having the desired option selections of the customer based on the value input associated with the desired option selections,
wherein the at least one remote computer is in communication with the at least one back office computer.

54. The system of claim 53, wherein the at least one remote computer comprises at least one run time database.

55. The system of claim 54, wherein the run time database of the at least one remote computer is updated with information from the at least one back office computer.

56. The system of claim 53, wherein the at least one back office computer and the at least one remote computer share information to permit common usage of data input into any of the at least one back office computer and the at least one remote computer.

57. The system of claim 53, wherein the at least one remote computer comprises at least one sales tool.

58. The system of claim 57, wherein the at least one sales tools comprises at least one of, a customer or account management tool, a product information tool, a financing tool, a service tool, a life cycle tool, a proposal tool, a presentation tool, or any combination of these tools.

59. The system of claim 57, wherein the at least one sales tool is used to assist a user in retrieving and presenting information to the customer.

60. The system of claim 53, wherein the at least one remote computer has configuration capabilities which allow a user to interactively configure a particular product which satisfies the customer's needs.

61. The system of claim 53, wherein at least one configuration tool is in communication with at least one inventory management tool, and the at least one inventory management tool allows a user to configure a product for sale from the inventory of the selling entity.

62. The system of claim 61, wherein the at least one configuration tool and the at least one inventory management tool allow a user to examine an impact of a particular selection may have with respect to whether a product can be purchased from the inventory.

63. The system of claim 53, wherein the at least one back office computer manages data.

64. The system of claim 63, wherein the data that is managed by the at least one back office computer comprises at least one of, inventory data, product information, configuration rules, or any combination of these.

65. The system of claim 53, wherein the at least one remote computer comprises a user interface and software to permit customers to interact directly with the computer system.

66. The system of claim 53, wherein the at least one remote computer is in communication with the at least one back office computer by using at least one of, a local area network, a wide area network, a wireless network, or any combination of these networks.

67. The system of claim 53, wherein the at least one remote computer is in communication with the at least one back office computer by using the internet.

68. The system of claim 53, wherein the at least one remote computer comprises an order management tool that allows a user to submit an order and remove the availability of a particular item from the inventory.

69. The system of claim 53, wherein the computer system is configured to identify sales which have been ordered, but not yet delivered, and alert a user when a particular product ordered to be built becomes available in the inventory.

70. The system of claim 53, further comprising
a user selecting a particular product option which is desired by the customer; and
specific product or other product options which are incompatible with the selected product option being highlighted or deactivated by the computer system to prevent subsequent selection of the incompatible option or product.

71. The system of claim 70, wherein the system prevents a user from selecting the compatible option or product.

72. The system of claim 53, wherein the computer system comprises a cross-reference solver that limits the number of unites or options available to a user to select from a competitive model or product.

73. The system of claim 53, wherein the value input associated with the desired options corresponds to one of: (i) a numeric value indicating importance of the associated desired option selection or (ii) a relative value indicating importance of the associated desired option selection as compared to other desired option selections.

74. The system of claim 53, wherein the logic rules are selected from a group consisting of: (i) constraint rules which define engineering relationships between product options used constraining use of combinations of options, (ii) resource rules which define relationships between product options in terms of resources used and resources required, and (iii) cross-reference rules which define relationships between similar product options.

75. The system of claim 53, wherein the configuration engine presents to the customer through the user interface the one or more identified available products found in the inventory of the selling entity that most closely match the configured product having the desired option selections of the customer.

76. The system of claim 53, wherein the configuration engine identifies from the inventory of the selling entity one or more available products that exactly correspond to the configured product.

77. The system of claim 53, wherein the configuration engine defines the configured product satisfying the customer's needs by constraining the selection of available product options to the stored configuration information related to selling entity products offered for sale by the selling entity.

* * * * *